(12) United States Patent
Lawson

(10) Patent No.: US 10,980,367 B2
(45) Date of Patent: Apr. 20, 2021

(54) AUTOMATED HOT BEVERAGE BREWING MACHINE

(71) Applicant: Roger G. Lawson, Toronto (CA)

(72) Inventor: Roger G. Lawson, Toronto (CA)

( * ) Notice: Subject to any disclaimer, the term of this patent is extended or adjusted under 35 U.S.C. 154(b) by 1526 days.

(21) Appl. No.: 14/449,873

(22) Filed: Aug. 1, 2014

(65) Prior Publication Data

US 2015/0033948 A1 Feb. 5, 2015

Related U.S. Application Data

(60) Provisional application No. 61/861,035, filed on Aug. 1, 2013.

(51) Int. Cl.
*A47J 31/00* (2006.01)

(52) U.S. Cl.
CPC .................. *A47J 31/007* (2013.01)

(58) Field of Classification Search
CPC .................................... A47J 31/007
USPC ........................................... 99/289
See application file for complete search history.

(56) References Cited

U.S. PATENT DOCUMENTS

| | | | | |
|---|---|---|---|---|
| 4,019,660 A * | 4/1977 | Berkey | ........ | A47G 19/34 222/304 |
| 5,480,054 A * | 1/1996 | Midden | ........ | A47J 41/0005 220/202 |
| 5,490,447 A * | 2/1996 | Giuliano | ........ | A47J 31/401 99/286 |
| 5,889,684 A * | 3/1999 | Ben-David | ........ | A47J 31/525 700/282 |
| 6,155,158 A * | 12/2000 | Anson | ........ | A47J 31/007 99/280 |
| 6,287,515 B1 * | 9/2001 | Koosman | ........ | A61L 2/183 422/186.07 |
| 6,755,119 B1 * | 6/2004 | Lyall | ........ | A47J 31/4478 99/299 |
| 8,459,178 B2 * | 6/2013 | Miller | ........ | A23F 3/18 99/289 R |
| 2004/0060594 A1 * | 4/2004 | Montpetit | ........ | F16K 23/00 137/59 |
| 2008/0110899 A1 * | 5/2008 | Gustafson | ........ | A47G 19/14 220/553 |
| 2013/0082130 A1 * | 4/2013 | Hulett | ........ | A47J 42/46 241/277 |
| 2013/0126536 A1 * | 5/2013 | Santy | ........ | B67D 1/16 220/571 |
| 2013/0333622 A1 * | 12/2013 | Jin | ........ | A01K 5/0291 119/51.01 |
| 2014/0014867 A1 * | 1/2014 | Hung | ........ | F16K 25/005 251/314 |
| 2014/0137749 A1 * | 5/2014 | Marchi | ........ | A47J 31/4496 99/302 R |

(Continued)

FOREIGN PATENT DOCUMENTS

WO WO-2006122879 A1 * 11/2006 ............... A47J 31/60

*Primary Examiner* — Christopher M Koehler
*Assistant Examiner* — Spencer H. Kirkwood

(57) ABSTRACT

The present invention relates to an apparatus for brewing hot beverages, and more particularly to an apparatus for automated brewing of coffee or tea. The apparatus for automated brewing of coffee comprises a frame structure defining an interior space, wherein the interior space houses a ground coffee feed system, a carousel assembly, a water system, a waste system and a coffee storage and dispensing system.

3 Claims, 21 Drawing Sheets

(56) References Cited

U.S. PATENT DOCUMENTS

2014/0217126 A1* 8/2014 Peirsman ............. B67D 1/0004
222/399

* cited by examiner

AUTOMATED HOT BEVERAGE BREWING MACHINE

TECHNICAL FIELD

The present invention relates to an apparatus for brewing hot beverages, and more particularly to an apparatus for automated brewing of coffee or tea.

BACKGROUND

Currently, most commercial establishments selling coffee use standard commercial drip coffee machines which include glass urns that brew 59 ounces of coffee.

Drip coffee is brewed manually, and every brew requires fresh ground coffee to be filled into a paper filter which is placed into a brew basket, and then mounted into the drip coffee machine. Once the brew basket is securely in place, the brewing cycle is activated by pressing a brew button. After brewing is complete, the brew basket must be removed from the drip coffee machine and the coffee grounds and filter discarded into the garbage. The brew basket urn is then rinsed and the process is repeated for another brewing cycle.

This process is extremely tedious and demanding, especially during peak business hours, making it difficult to consistently control the quality level of coffee while ensuring consumers are being served in a hospitable manner.

This brewing process has been unchanged for the past 30-years and is currently used today although population has increased as well as the consumption of coffee. The average amount of coffee sold at an establishment during a 17-hour day is approximately 19,353 cups of coffee (15 ounce cup), and 50% of the cups are sold within a five hour window, typically between 6 am until 11 am.

Larger coffee brewers are available that can brew greater quantities, but due to the limited amount of space available in coffee shops this option is not generally feasible. Additional concerns, include, (1) compromised coffee quality, loss of favourable flavour, appropriate heat, and freshness during non-peak hours since the brewed coffee should be consumed within a certain amount of time to ensure a true quality of freshly brewed coffee and to avoid staleness; (2) larger brew basket present difficulties for staff to use safely, and often lead to staff getting burned from spillage of the hot brewed coffee.

SUMMARY OF THE INVENTION

The present invention has been developed in view of the difficulties in the art noted and described above.

To at least partially overcome these disadvantages, the present invention provides an apparatus for automated hot beverage brewing, as for example for brewing coffee or tea.

In one aspect, the present invention resides an apparatus for automated brewing of coffee comprising: a frame structure defining an interior space, wherein the interior space houses a ground coffee feed system, a carousel assembly, a water system, a waste system and a coffee storage and dispensing system.

BRIEF DESCRIPTION OF THE DRAWINGS

Reference may now be made to the following detailed description taken together with the accompanying drawings in which.

DETAILED DESCRIPTION

Figure 1:
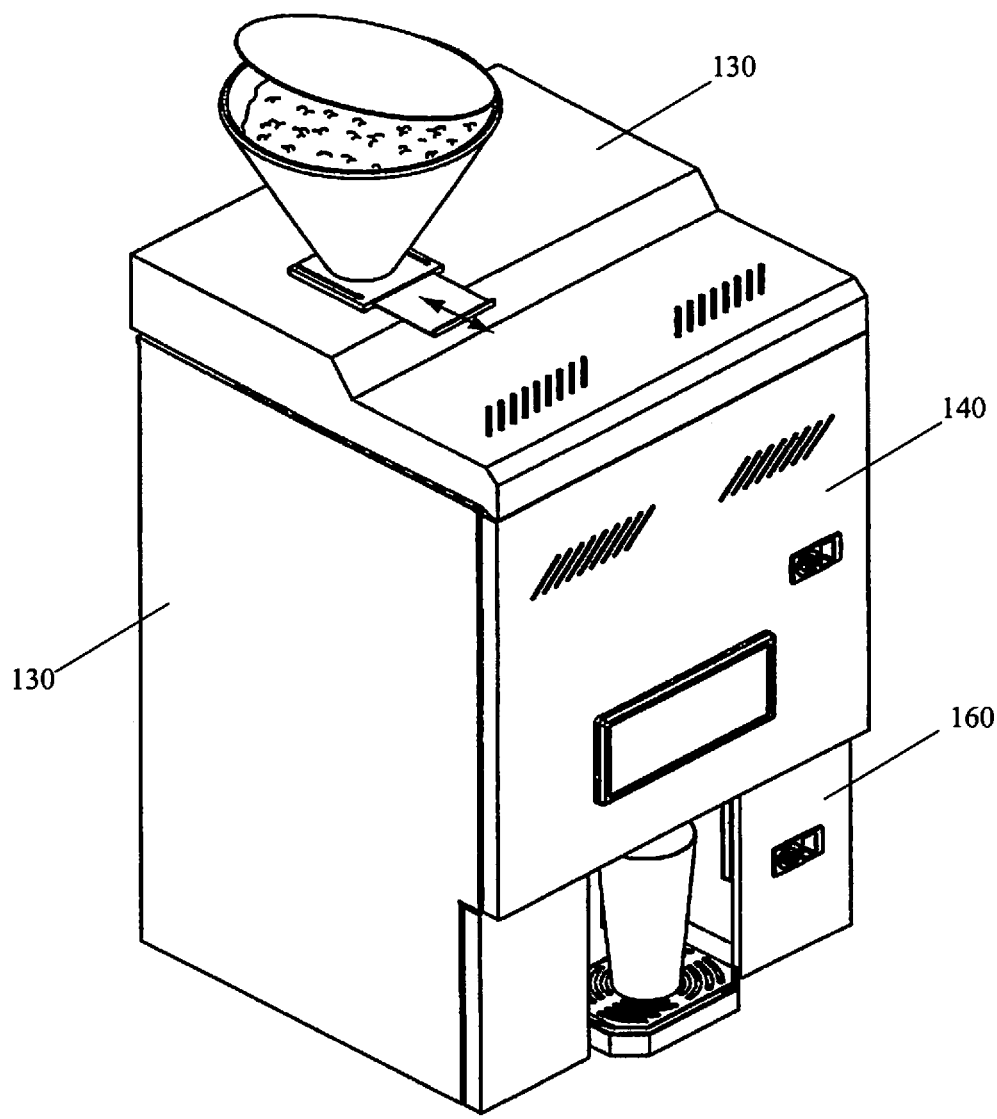
FIG. 1 illustrates a perspective view of an apparatus for brewing coffee in accordance with an embodiment of the present invention.
Figure 2:
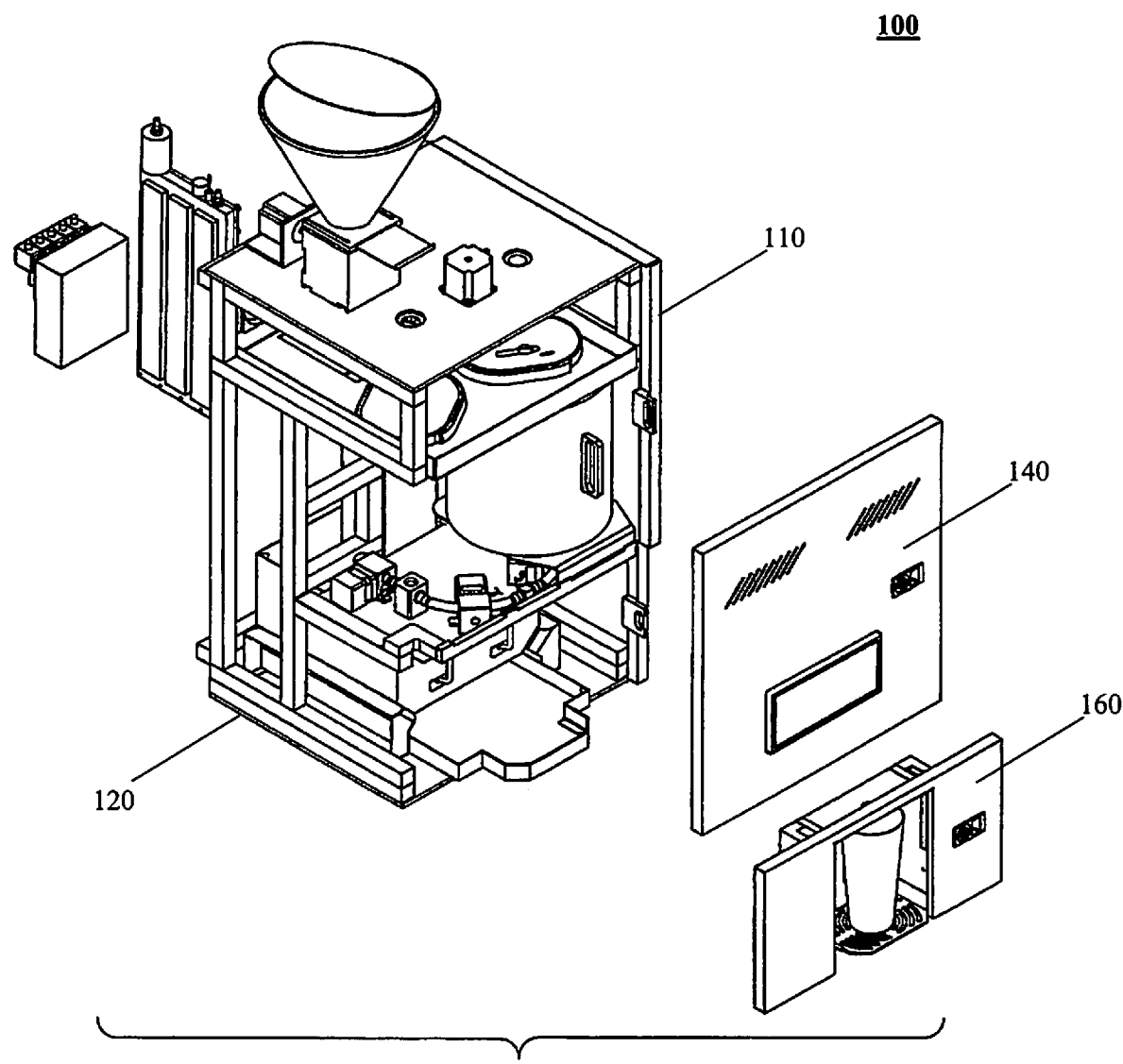
FIG. 2 illustrates an exploded perspective of the apparatus shown in FIG. 1.

Reference will now be made to FIGS. 1 to 21 which illustrate a preferred embodiment of an apparatus for brewing coffee 100 in accordance with the present disclosure.

The coffee apparatus 100 has a box-like frame structure 110 having a base 120. Outer surface paneling 130, hinged front upper display bezel 140 and hinged lower door fill bay 160 are mounted to the frame structure 110 and define an interior space of the apparatus 100. Preferably the outer surface paneling 130, front upper display bezel 140 and lower door fill bay 160 are formed from like weight sheet metal such as aluminium.

The interior space houses the ground coffee feed system 200, carousel assembly 300, water system 400, waste system 500 and coffee storage and dispensing system 600 of the apparatus 100.

Figure 3:
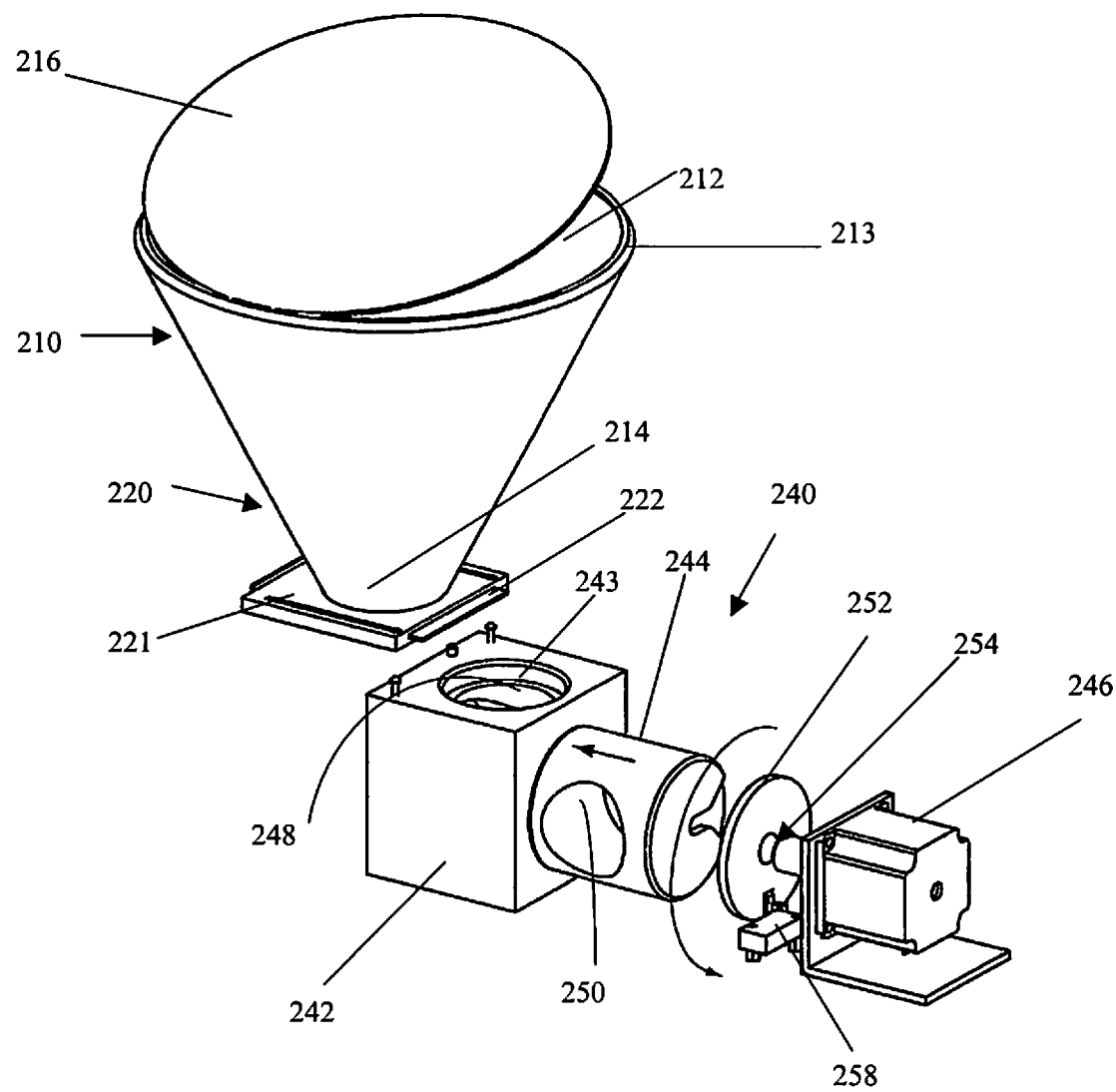
FIG. 3 illustrates a partially exploded perspective view of the ground coffee feed system of the apparatus shown in FIG. 1.

FIG. 3 illustrates a perspective view of the ground coffee feed system 200. The feed system 200 includes a hopper in the form of a conically shaped funnel 210 for receiving and storing ground coffee, a shutter assembly 220 and a portion control assembly 240.

The funnel 210 define an open top 212 and an open bottom 214. A funnel cover 216 is provided to cover/seal the open top 212 of the funnel 210 to protect the stored ground coffee from the environmental conditions, such as excess moisture in the ambient air, to retain the ground coffee aroma and quality characteristics. Preferably, a seal 213 is disposed between the cover 216 and funnel 210 which provides an airtight seal between the cover 216 and the funnel 210 when the cover 216 is installed on the funnel 210. A sensor may be arranged to detect and recognise the presence and type of ground coffee being stored in the funnel, and coffee brewing parameters may be preset and automatically controlled based on the detected ground coffee type stored in the funnel 210.

The funnel 210 is mounted to a base 221 of the shutter assembly 220. The base 221 defines an opening or passageway passing through the base 221. The passageway is aligned directly with the open bottom 214 of the funnel 210. The base 221 supports a sliding funnel shutter 222 which is movable with respect to the base 221 between an open position and a closed position. Ground coffee stored in the funnel 210 may pass from the open bottom 214 of the funnel 210 through the passageway defined by the base 221 when the funnel shutter 222 is in the open position, and when the funnel shutter 222 is in the closed position the passageway is blocked so that the ground coffee is retained in the funnel 210.

In an alternative embodiment, a bean grinder may be interposed between the funnel 210 and shutter assembly 220. The funnel 210 may receive coffee beans instead of ground coffee, and the bean grinder between the funnel 210 and shutter assembly 220 can grind the beans to the desired grind size.

The base 221 is detachably secured to a housing body 242 of the portion control assembly 240 so that the base 221 can be removed from the portion control assembly 240. Preferably a quick release mechanical locking mechanism detachably secures the base 221 to the housing body 242. With the funnel shutter 222 in the closed position, the shutter assembly 220 together with the funnel 210, and any ground coffee stored in the funnel 210, can be quickly removed from the coffee apparatus 100 and replaced by another funnel and shutter assembly. The detachably secured base 221 allows for quick changeovers between different types of ground coffee being brewed, and facilitates cleaning of the funnel 210.

The housing body 242 defines in opposing relationship, a top inlet opening 248 and a bottom outlet opening (not shown). The inlet opening 248 is aligned directly below the passageway defined by the base 221 and the open bottom 214 of the funnel 210 when the base 221 is mounted to the top of the housing body 242.

A portioning cup 244 is rotatably supported in the housing body 242 and is driven by a motor 246 through a portion coupler 252 attached to one end of the portioning cup 244. The coupler 252 connects the rotation of the portioning cup 244 to the drive shaft 254 of the motor 246. Preferably an indexing switch 258 monitors and provides feed back controls for the rotation of the portioning cup 244 of the coffee apparatus 100.

The portioning cup 244 defines a cavity 250 which receives the ground coffee to be brewed from the funnel 210. In operation, the cavity 250 of the portioning cup 244 is rotated into alignment directly below the passageway through the base 221. With the funnel shutter 222 in the open position, ground coffee stored in the funnel 210 may pass through the bottom opening 214 and passageway in the base 221 into the inlet opening 248 of the housing body 242 so that the ground coffee is received in and fills the cavity 250. Preferably, when the portioning cup 244 is positioned to receive the ground coffee, the motor 246 imparts a vibratory frequency to the portion ground coffee feed system 200 to assist the flow of ground coffee from the funnel 210 into the cavity 250. The motor is preferably a stepper motor or servo motor with position control. Wiper blades 243 are provided about the periphery of the inlet opening 248 between the portioning cup 244 and the housing body 242 to prevent granules of ground coffee from wedging between the housing 242 and the portioning cup 244 during rotation of the portioning cup 244.

The cavity 250 is sized to provide a fixed volume of ground coffee to be brewed. Once the cavity 250 is filled, the portioning cup 244 is rotated by the motor 246 approximately 180° degrees into alignment with the outlet opening defined in the bottom end of the housing body 242.

The apportioned ground coffee stored in the cavity 250 is gravity fed from the cavity 250 through the outlet opening of the housing body 242 into a brew basket 310 of the carousel assembly 300 arranged in a ground coffee receiving position below the portioning cup 244. Preferably, to assist in fully dumping the ground coffee to be brewed from the cavity 250 into the brew basket 310, the motor 246 similarly imparts a vibratory frequency to the portion ground coffee feed system 200 to assist the flow of ground coffee from the cavity 250 of the portioning cup 244. The cavity 250 is now empty and further rotated 180° degrees into alignment directly below the passageway through the base 221 and inlet opening 248 to receive the next batch of ground coffee to be brewed. This process may be repeated until the desired amount of apportioned ground coffee is dumped and received by the brew basket 310.

Figure 4:
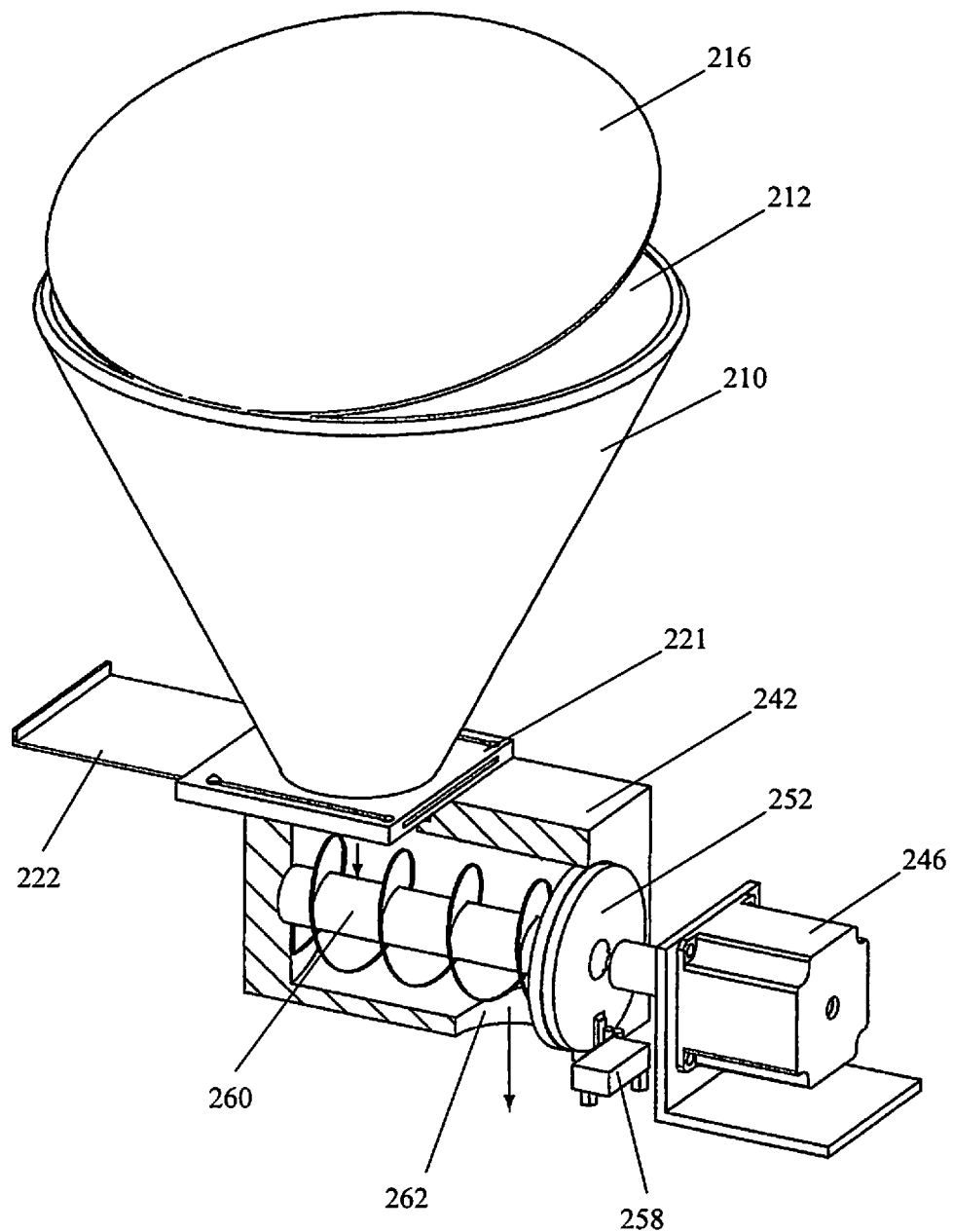
FIG. 4 illustrates an alternative embodiment of a portion control assembly in accordance with the present invention.
Figure 5:
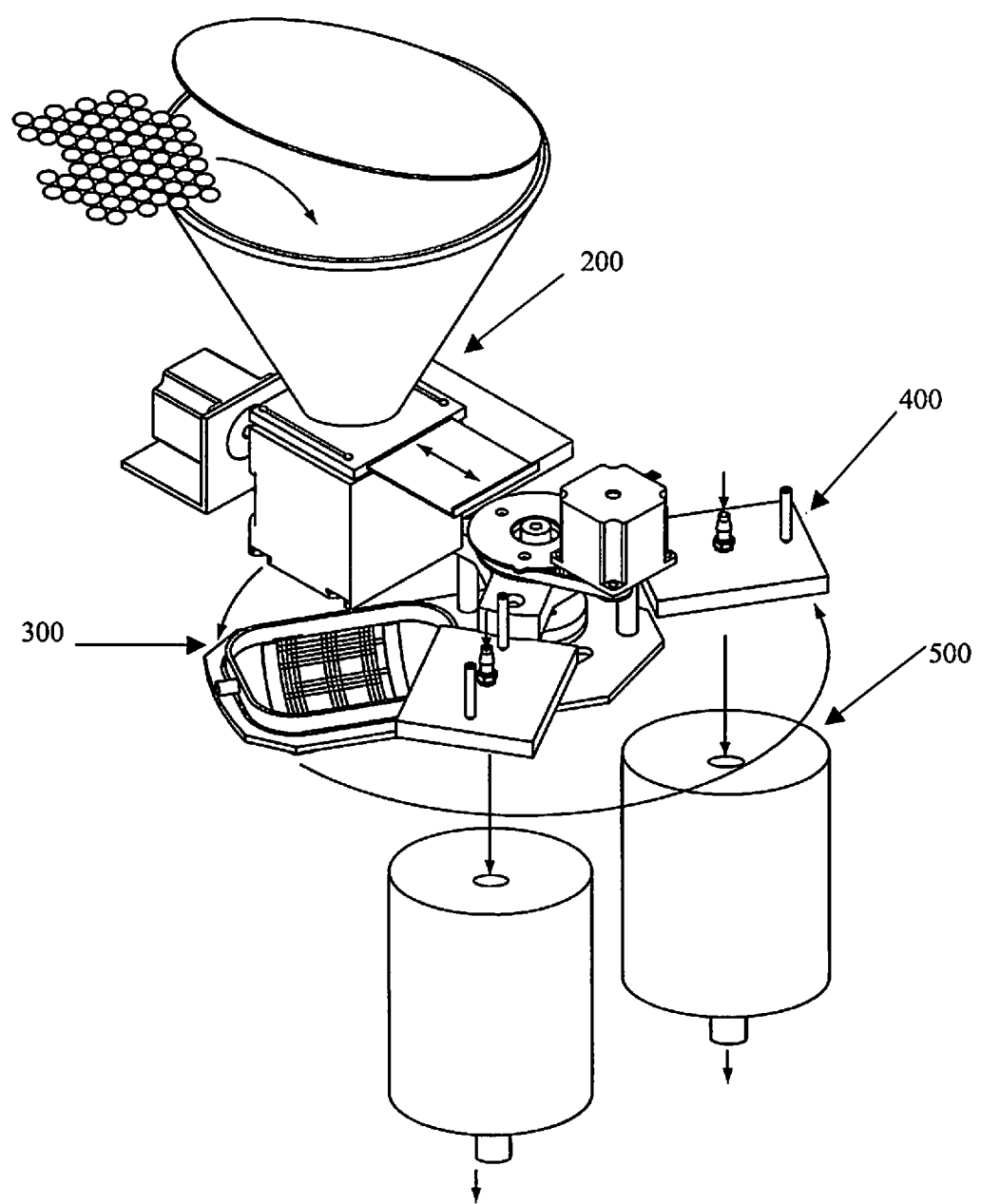
FIG. 5 illustrates the ground coffee feed system, carousel assembly, water system, and coffee storage system of the apparatus shown in FIG. 1.
Figure 6:
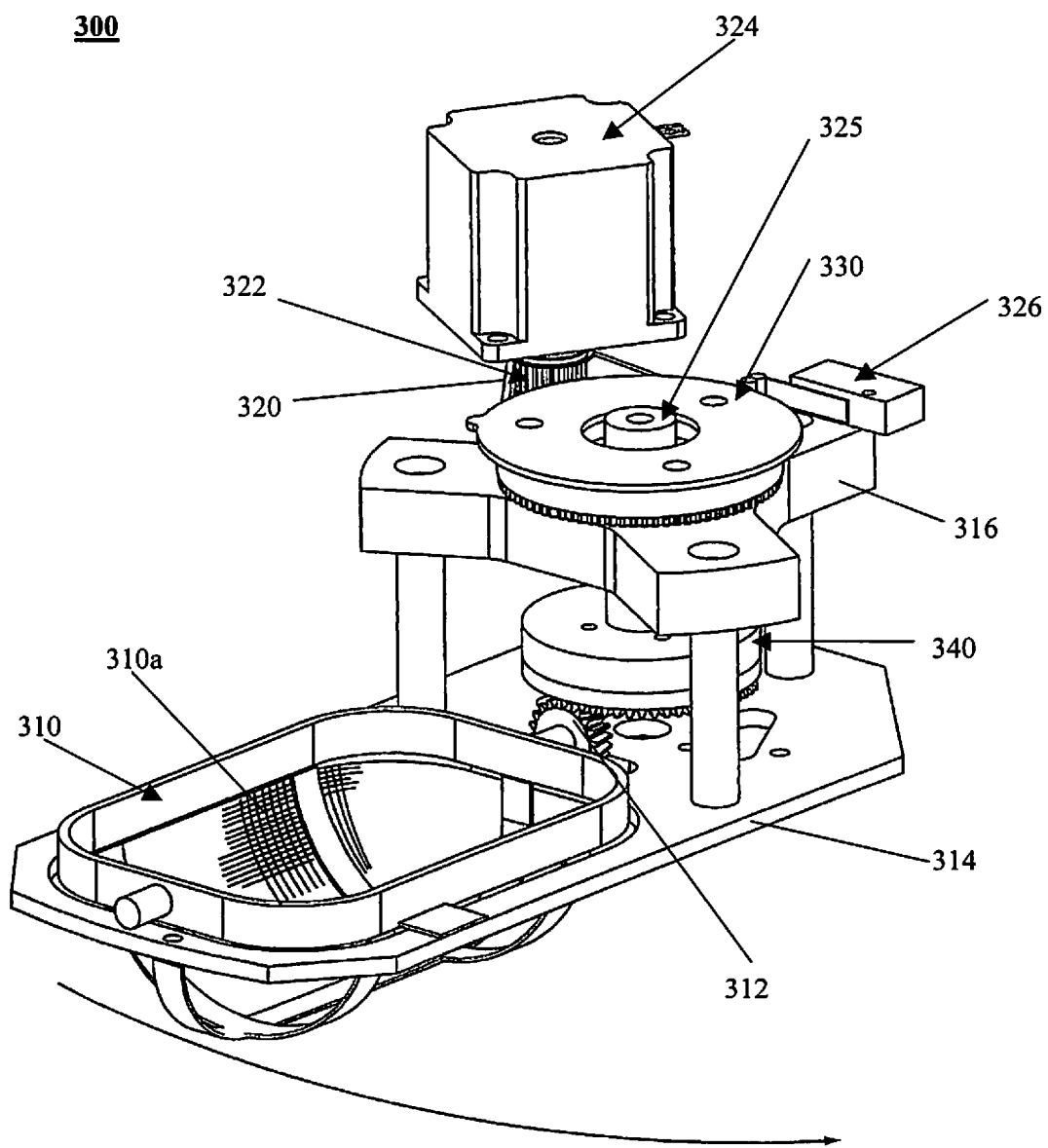
FIG. 6 illustrates a perspective view of the carousel assembly of the apparatus shown in FIG. 1 with the brew basket in an upright position.
Figure 7:
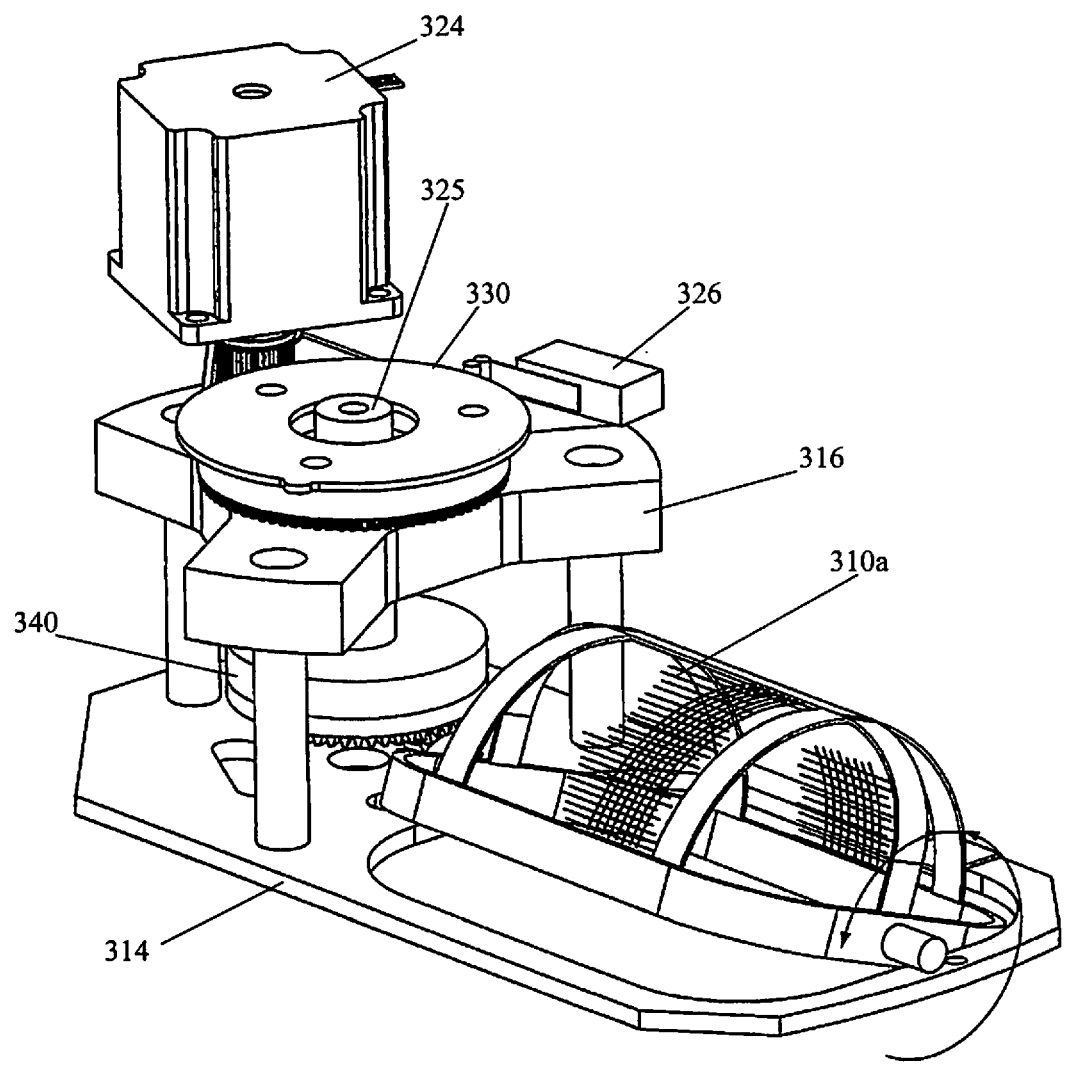
FIG. 7 illustrates a perspective view of the carousel assembly of the apparatus shown in FIG. 1 with the brew basket in an inverted position.
Figure 8:
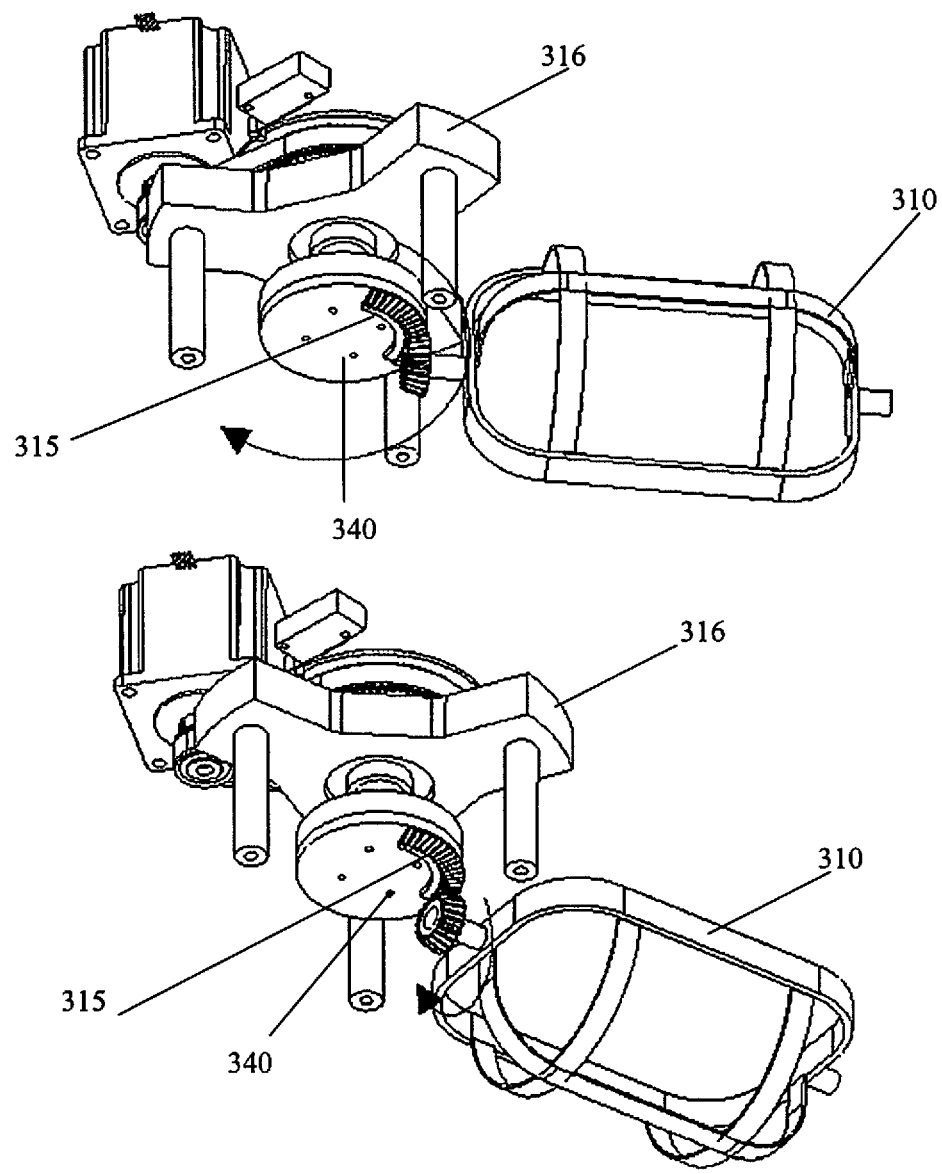
FIG. 8 illustrates a perspective view of the brew basket inversion process of the carousel assembly shown in FIGS. 7 and 8.
Figure 9:
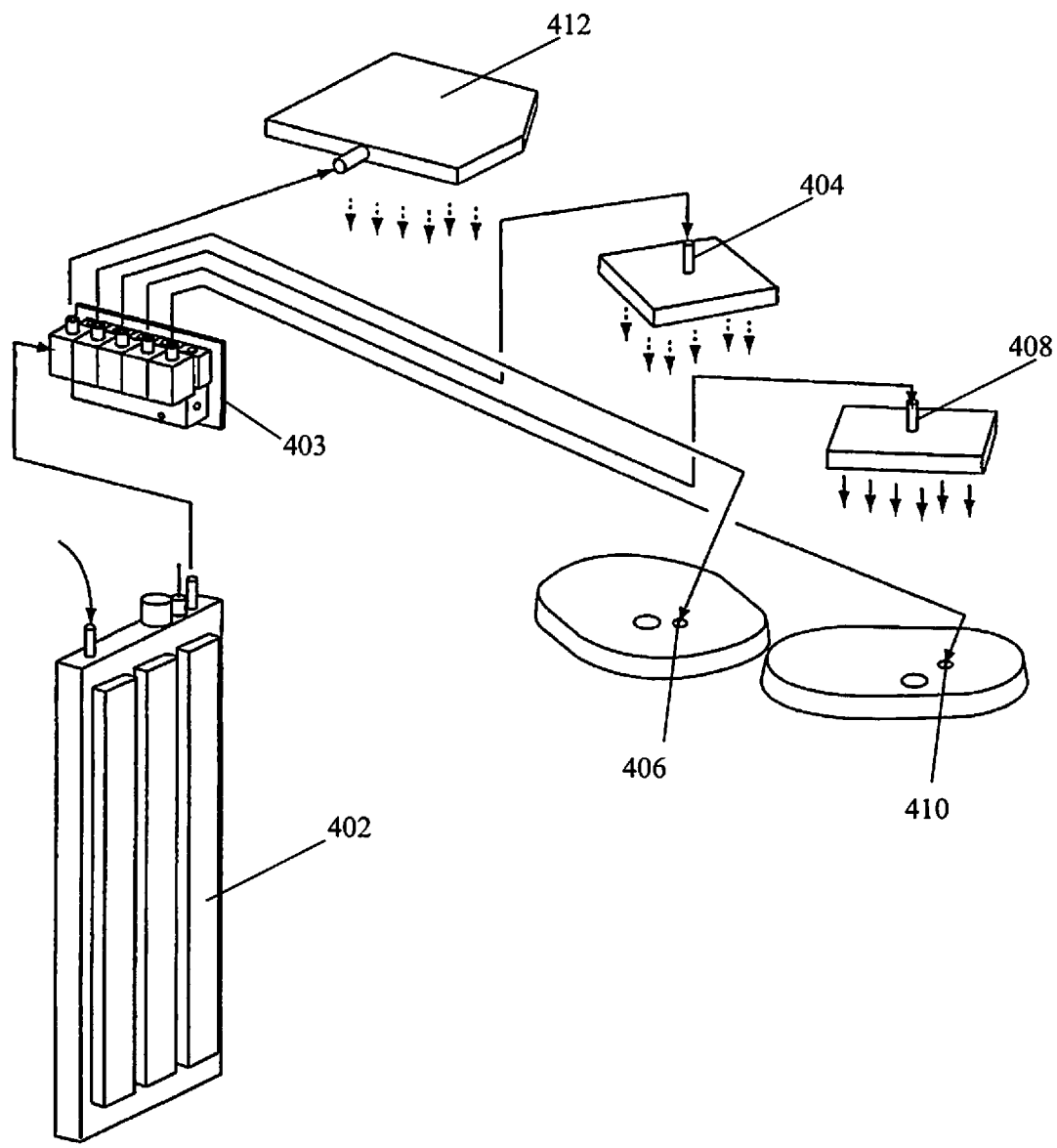
FIG. 9 illustrates the water system of the apparatus shown in FIG. 1.
Figure 10:
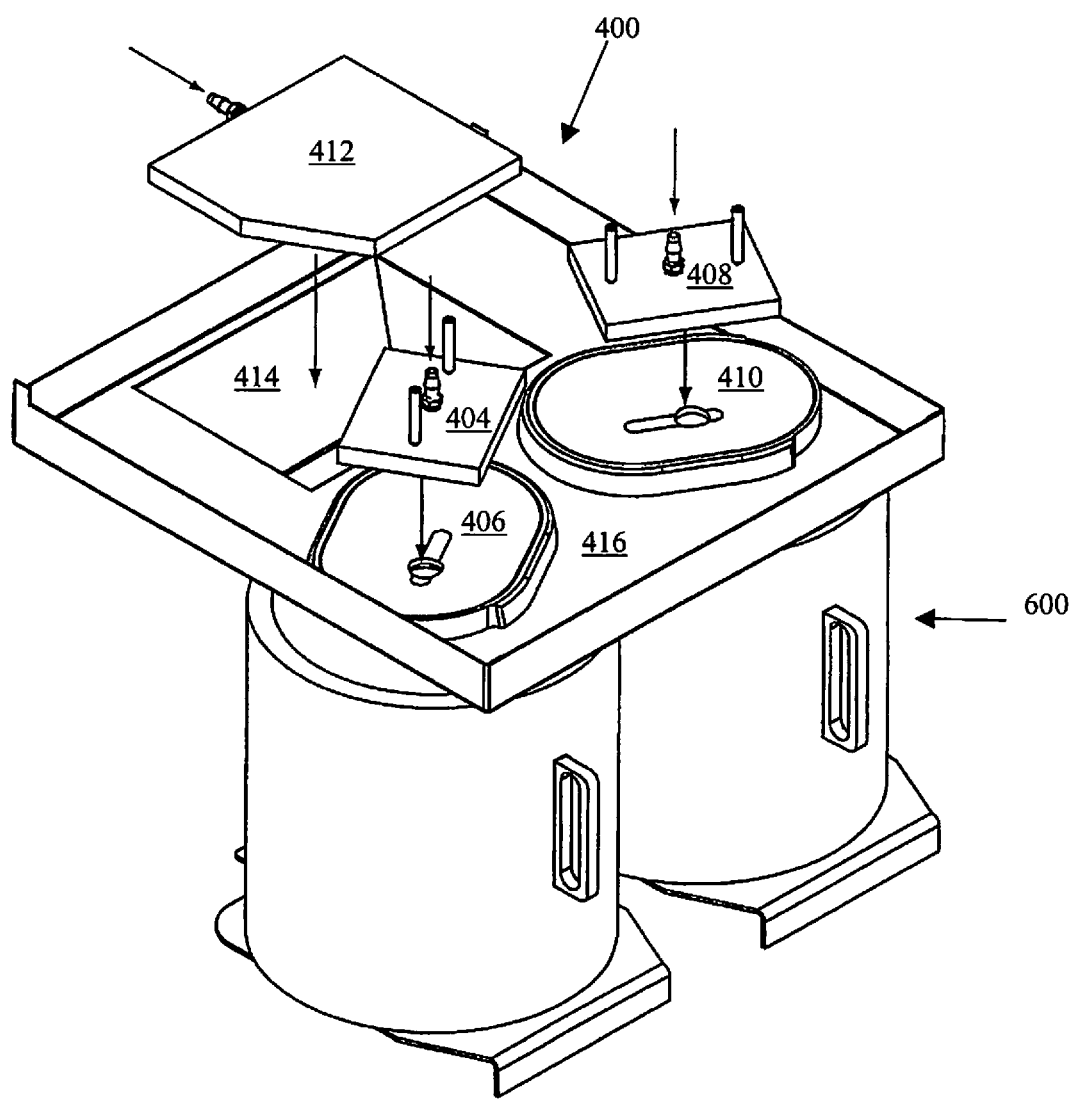
FIG. 10 illustrates the water system and coffee storage and dispensing system of the apparatus shown in FIG. 1.
Figure 11:
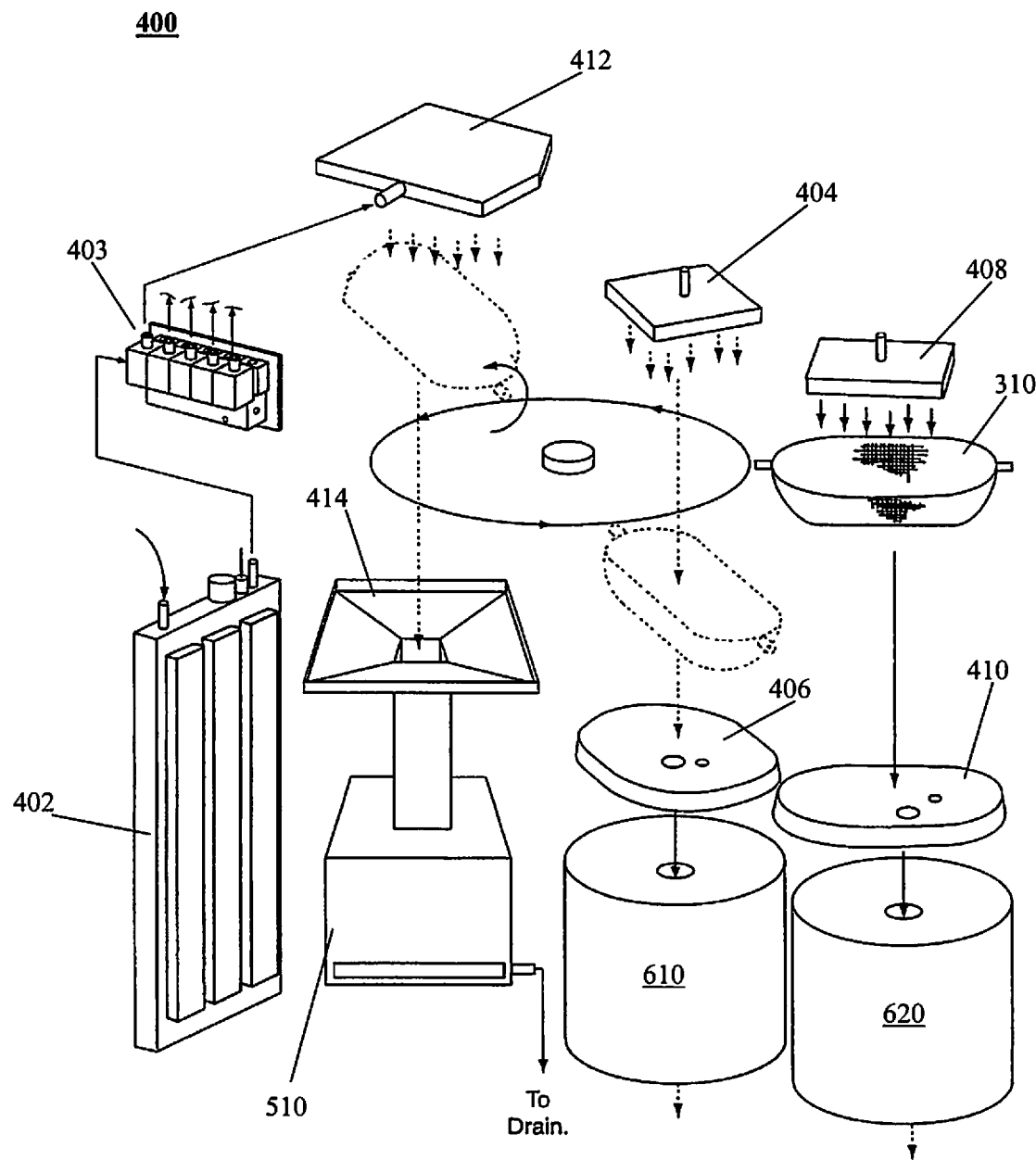
FIG. 11 illustrates the water system, coffee storage system and waste system of the apparatus shown in FIG. 1.
Figure 12:
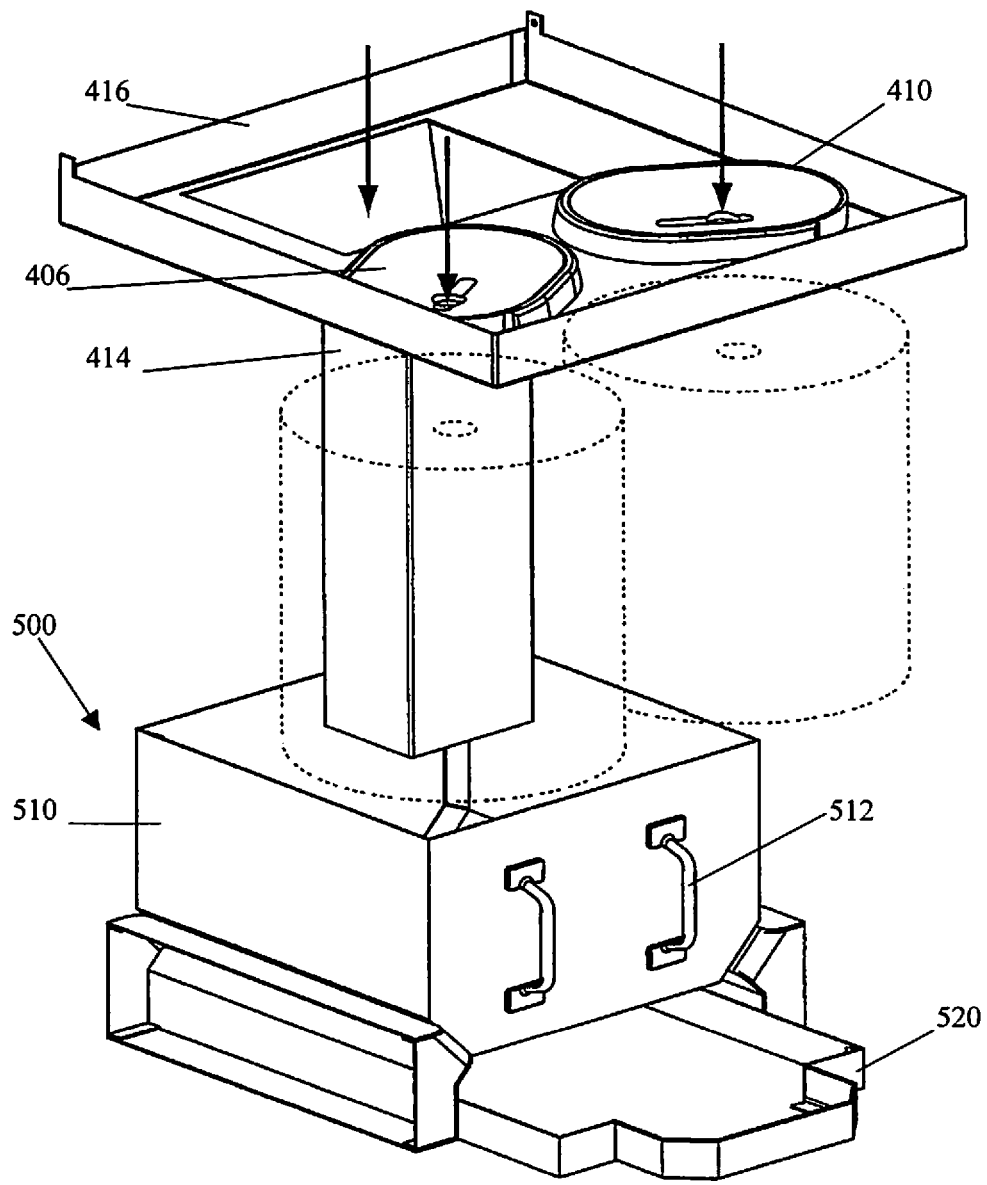
FIG. 12 illustrates a perspective of the waste system of the apparatus shown in FIG. 1.
Figure 13:
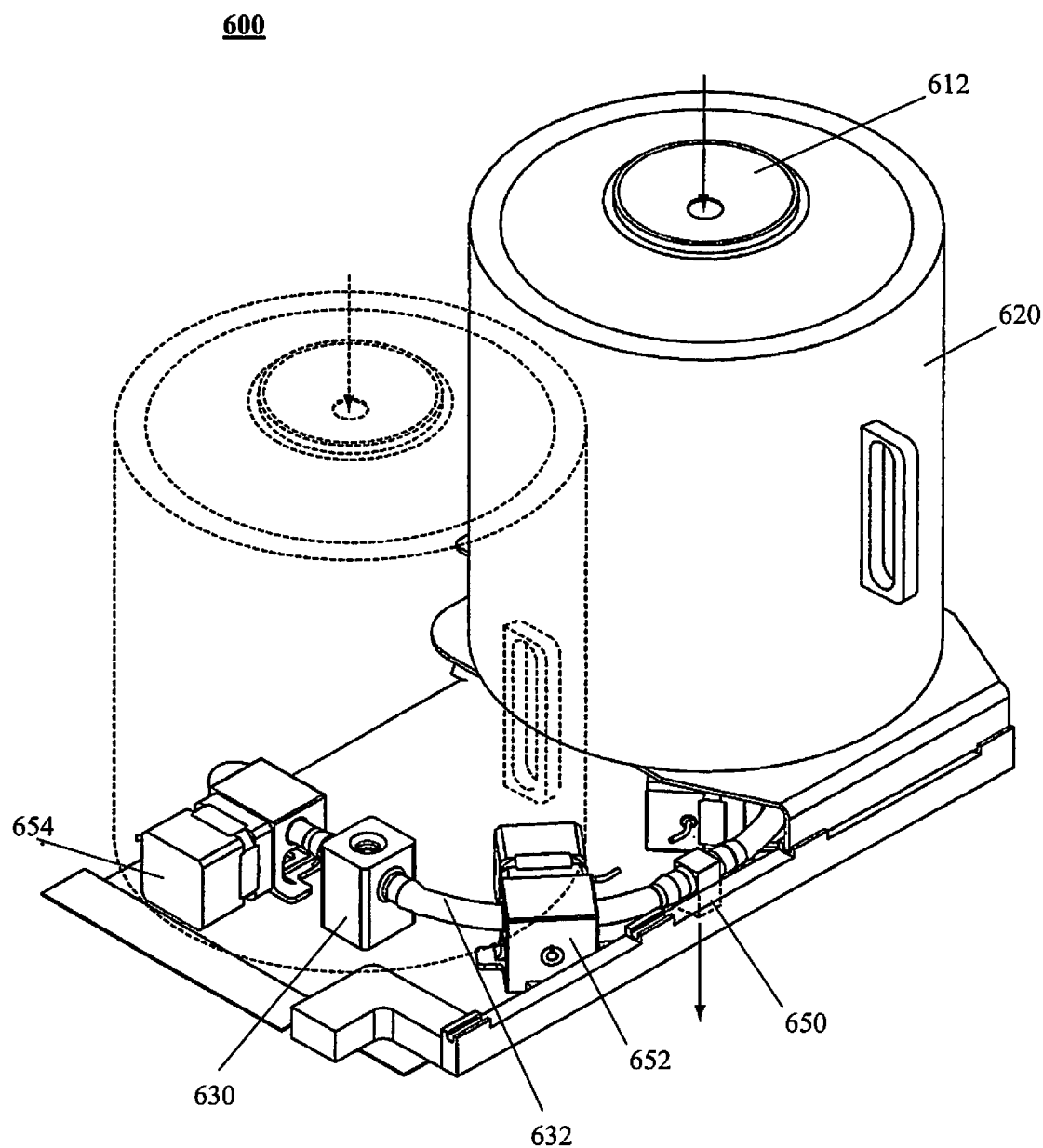
FIG. 13 illustrates a perspective view of the coffee storage and dispensing system of the apparatus shown in FIG. 1.
Figure 14:
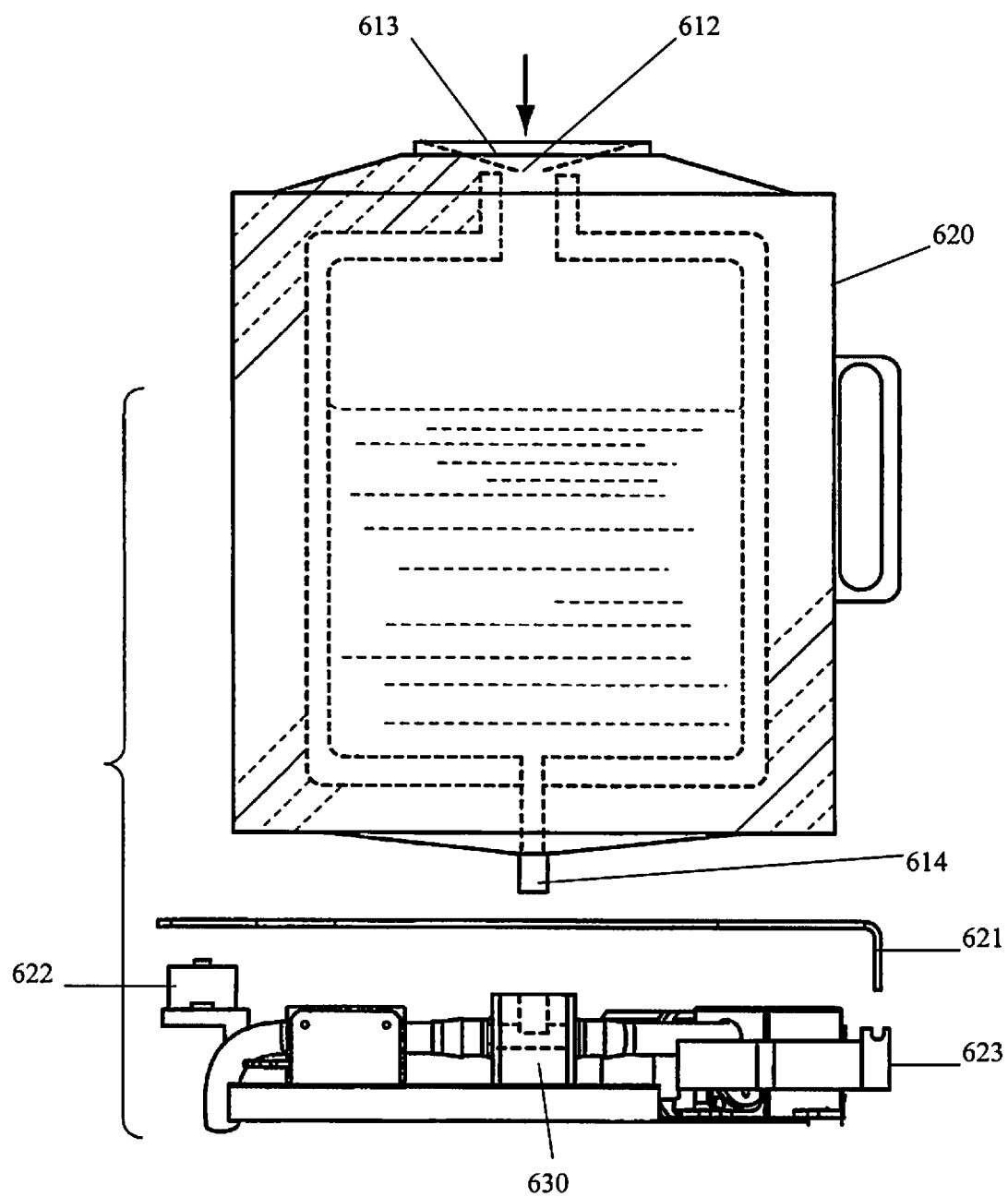
FIG. 14 illustrates a left side exploded elevation view of the carafe of the coffee storage and dispensing system shown in FIG. 13.
Figure 15:
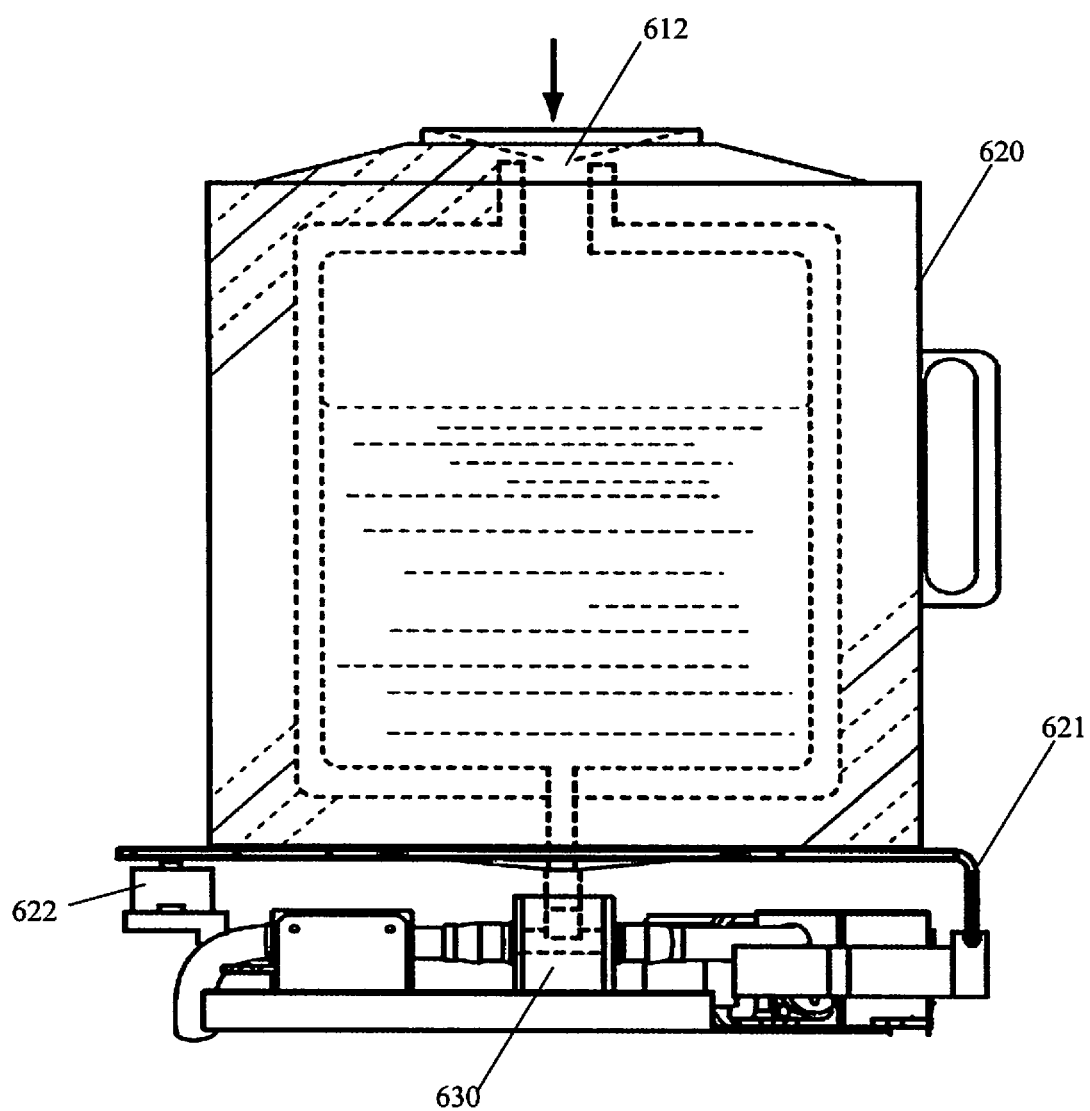
FIG. 15 illustrates a left side elevation view of the carafe of the coffee storage and dispensing system shown in FIG. 13.
Figure 16:
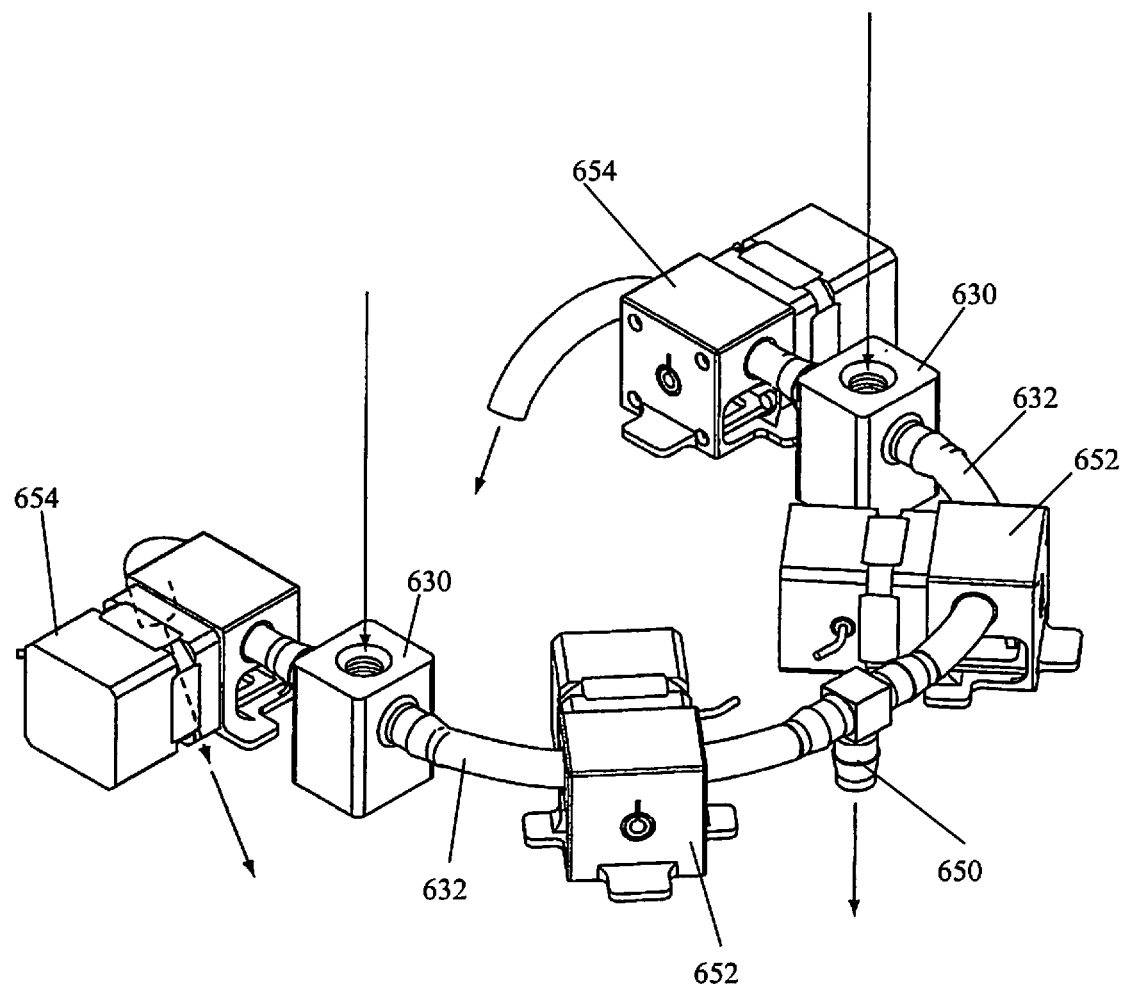
FIG. 16 illustrates a perspective of the dispensing valve and waste valve of the coffee storage and dispensing system shown in FIG. 15.
Figure 17:
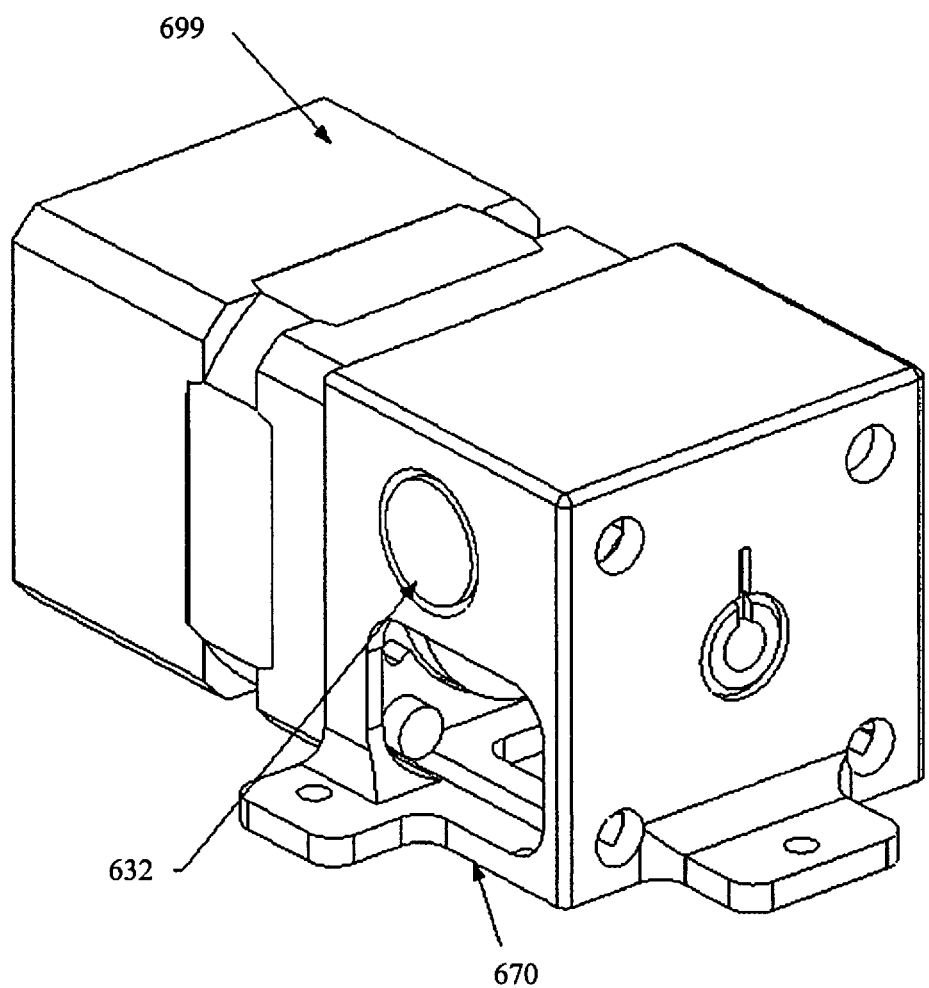
FIG. 17 illustrates a perspective of the dispensing valve shown in FIG. 16
Figure 18:
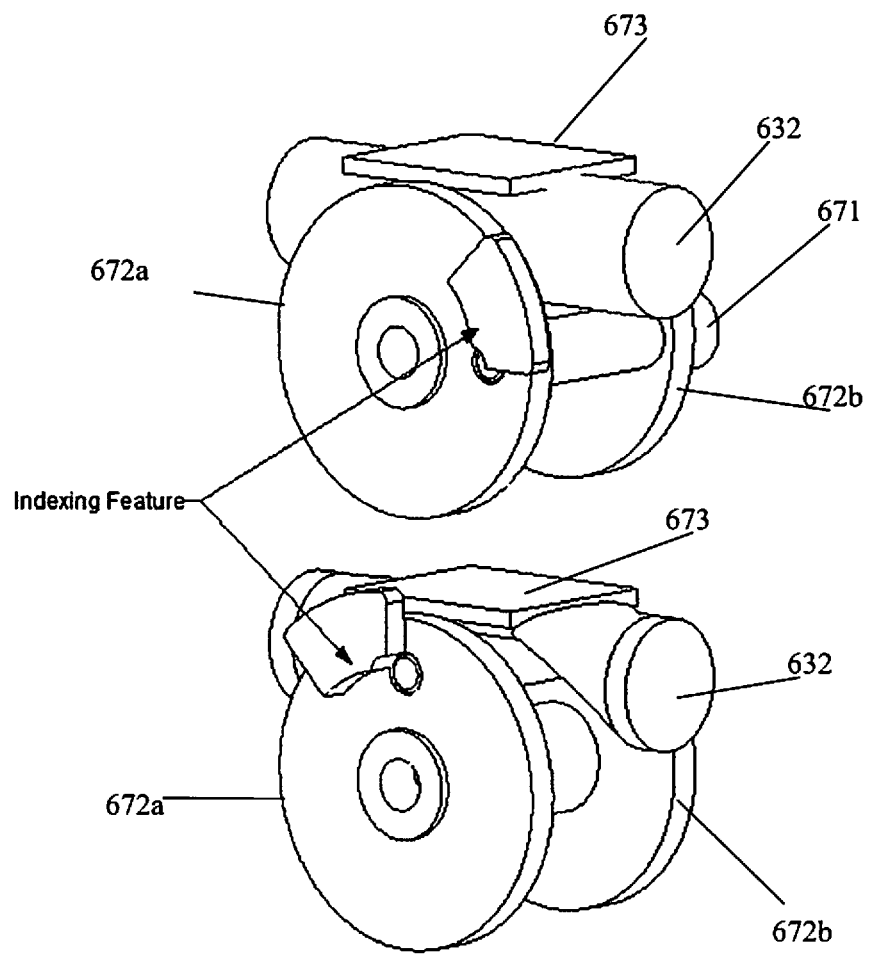
FIG. 18 illustrates a perspective view of the valve bobbins and cushioning mat shown in FIG. 17.
Figure 19:
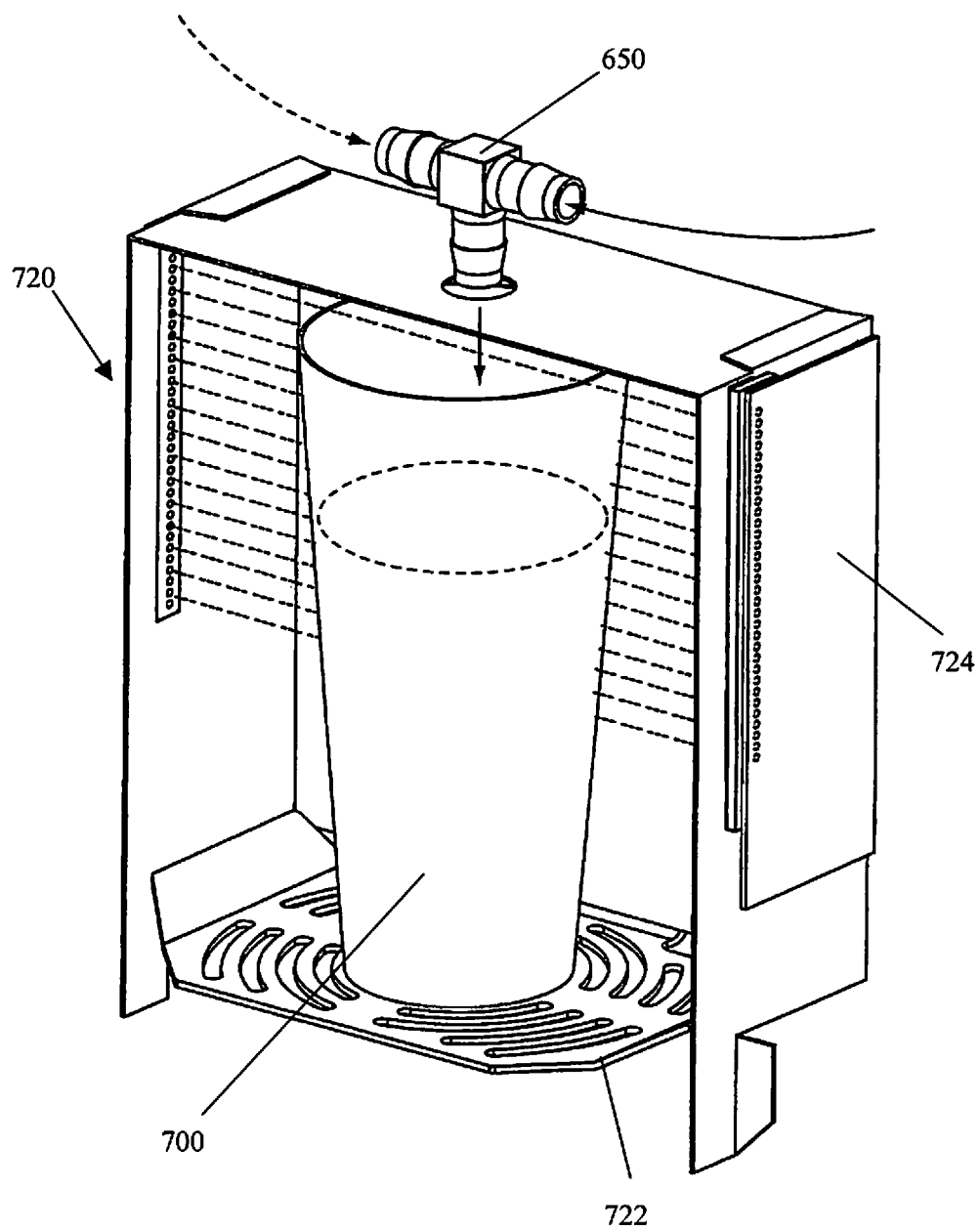
FIG. 19 illustrates a front perspective view of the fill bay of the apparatus shown in FIG. 1.
Figure 20:
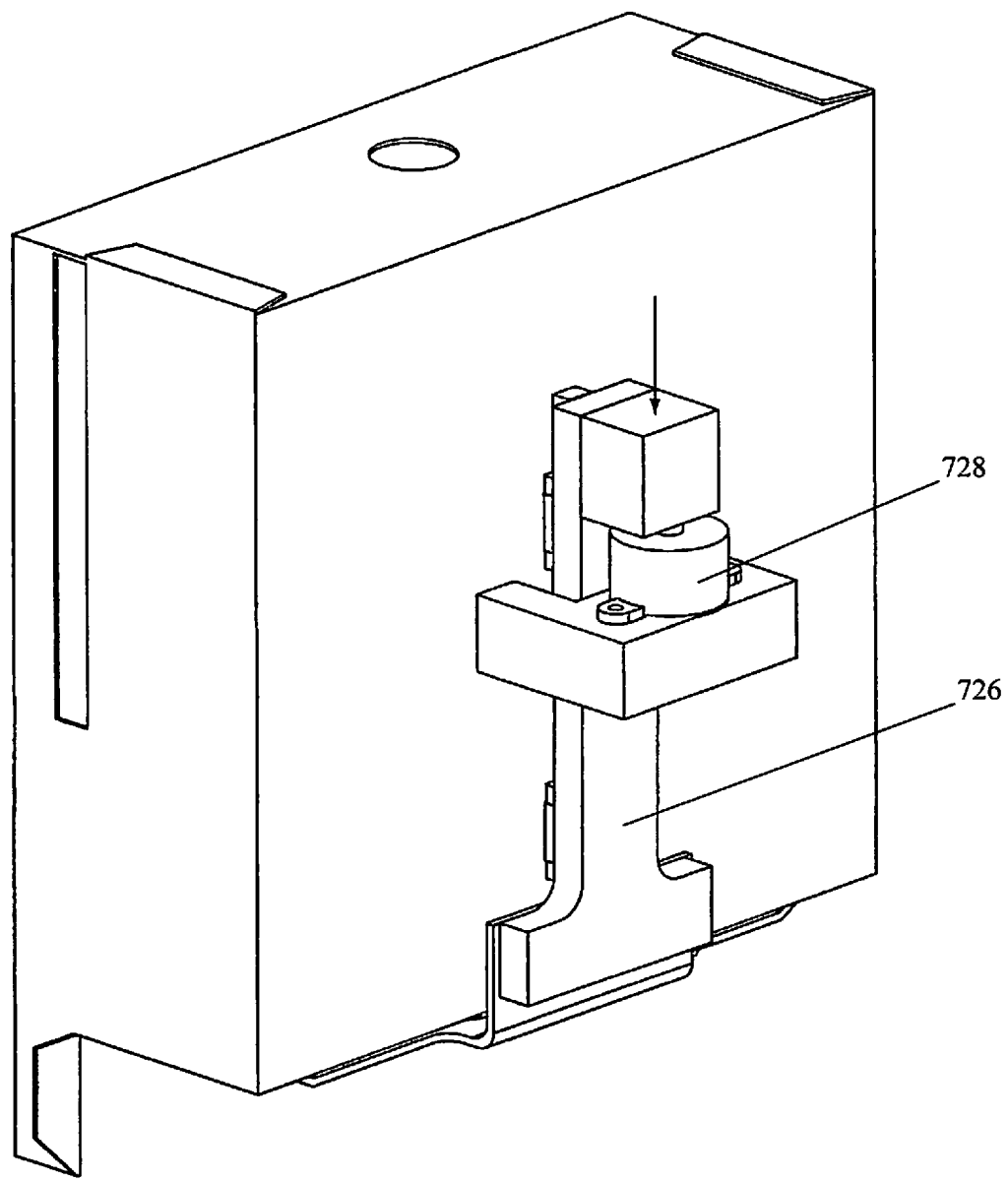
FIG. 20 illustrates a rear perspective view of the fill bay of the apparatus shown in FIG. 1.
Figure 21:
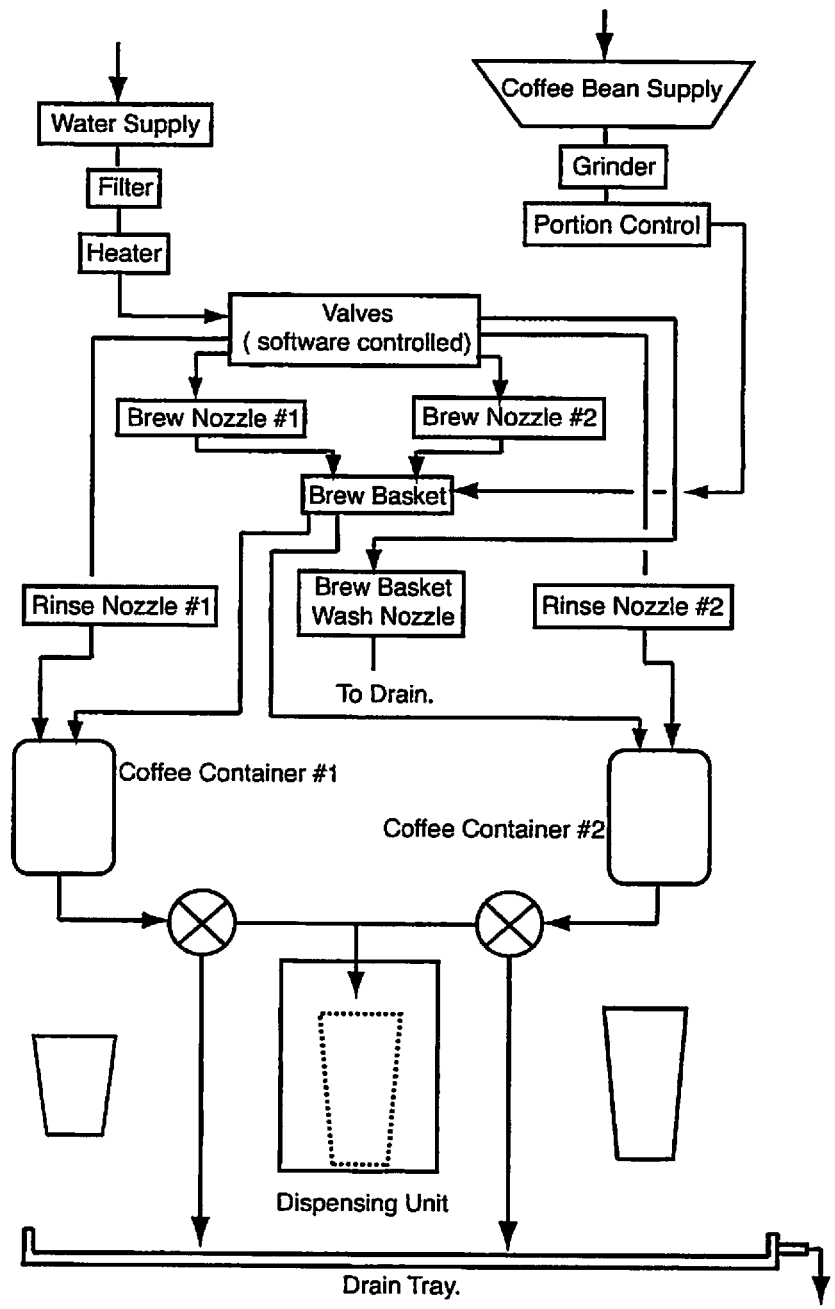
FIG. 21 illustrates a brewing process with the apparatus shown in FIG. 1.

In an alternative embodiment of the portion control assembly shown in FIG. 4, the rotatable portioning cup 244 may be replaced by a rotatable auger conveyor 260 housed in the housing body 242. The auger conveyor 260 is rotationally coupled to the motor 246 through the portion coupler 252 and rotationally monitored by the index switch 258. The auger conveyor 260 is rotated by the motor 246 to convey the ground coffee received in the housing body 242 from the funnel 210 towards the outlet opening 262 arranged at a bottom end of the housing body 242 and into the brew basket 310 of the carousel assembly 300 arranged below the outlet opening 262.

The brew basket 310 is sized to receive the desired apportioned amount of ground coffee for the brewing process. The brew basket 310 includes a fine mesh structured bottom 310a having openings sufficiently sized to prevent individual ground coffee granules stored in the basket 310 to pass through the meshing. The brew basket 310 effectively functions as a reusable filter during the brewing process. Preferably, the mesh structure 310a is made from woven stainless steel.

The brew basket 310 is supported by a carousel plate 314 which is attached to a carousel assembly frame 316. A motor 324, preferably a stepper motor or servo motor with position control, drives a gear 322 coupled to a carousel gear 330 by a drive belt 320. The carousel gear 330 is attached to the assembly frame 316 so that the motor 324 rotatably turns the carousel assembly frame 316, and in turn, rotates the carousel plate 314 and brew basket 310 counter clockwise 360° degrees about shaft 325 in the direction shown by the arrow. Preferably an indexing switch 326 monitors and provides feed back controls for the rotation of the carousal gear 330.

The brew basket 310 is rotated between the ground coffee receiving position, a first brewing station for brewing coffee, a second brewing station for brewing coffee, and a basket rinse station as will be more fully detailed below.

The water system 400 provides hot water to be used to brew the apportioned ground coffee received by the brew basket 310 and to rinse the coffee grounds from the brew basket 310 after the brewing process. Preferably the water system 400 is connected to a main water supply line (not shown) of a building. The water system 400 includes a boiler 402, preferably an in-line boiler, which supplies hot water through a solenoid manifold 403 which selectively distributes the hot water between a first brew nozzle 404 arranged above a first coffee catchment funnel 406, a second brew nozzle 408 arranged above a second coffee catchment funnel 410, and a basket rinse nozzle 412 arranged above a coffee grounds waste chute 414.

In the first brewing station the brew basket 310 filled with ground coffee to be brewed is rotated to a position between the first brew nozzle 404 and the first coffee catchment funnel 406. Preferably, the first brew nozzle 404 includes a number of sprinkler heads or orifices which distribute a fixed amount of hot water evenly through the brew basket 310 to wet and brew the ground coffee. The brewed coffee drips from the brew basket 310 into the first coffee catchment funnel 406, which is positioned within a brew plate 416 directly beneath the first brew nozzle 404. The brew plate 416 functions to catch any over flow of fluid and directs the over flow towards the waste chute 414. The brew basket 310 remains between the first brew nozzle 404 and first coffee catchment funnel 406 for a predetermined set amount of time required to fully brew the coffee, according to the specific requirements of the ground coffee being brewed, including heat, time, temperature, volume and flow rate of water to ground coffee.

The second brewing station is of a similar construction as the first brewing station. Depending on where the brewed coffee is required, the brew basket 310 filled with the ground coffee to be brewed can instead be rotated past the first brewing station and into the second brewing station to a position between the second brew nozzle 408 and the second coffee catchment funnel 410. The second brew nozzle 408 likewise preferably includes a number of sprinkler heads or orifices which distribute a fixed amount of hot water evenly through the brew basket 310 to wet and brew the ground coffee. The brewed coffee drips from the brew basket 310 into the second coffee catchment funnel 410 positioned within the brew plate 416 directly beneath the second brew nozzle 408. The brew basket 310 similarly remains between the second brew nozzle 408 and catchment funnel 410 for a predetermined set amount of time required to fully brew the coffee according to the coffee specifications.

Once the coffee has been brewed, the coffee grounds remaining in the brew basket 310 are disposed of through the waste chute 414. To dispense the coffee grounds, the brew basket 310 in the first brewing station or the second brewing station is further rotated about the carousel shaft 325 into a rinse station where the brew basket 310 is arranged between the basket rinse nozzle 412 and the waste chute 414.

Affixed to the bottom of the carousel shaft 325 is a stationary basket indexing gear 340. The indexing gear 340 has a number of downwardly extending gear teeth 315 arranged on only a partial portion of the bottom surface of the indexing gear 340. The indexing gear 340 is fixedly secured to the carousel shaft 325 so that it does not rotate with the carousel plate 314. As the brew basket 310 rotates towards rinse nozzle 412, a bevelled gear 312 arranged on one end of the brew basket 310 engages with the teeth 315 of the indexing gear 340 so that the brew basket entering into the rinse station is inverted upside down directly below the rinse nozzle 412 and above the waste chute 414. Preferably the rinse nozzle 412 includes a number of sprinkler heads or orifices which distribute a fixed amount of water at a predetermined flow rate evenly over the brew basket 310.

The rinse nozzle 412 is arranged to be positioned directly above the fully inverted brew basket 310 and sprays water into the inverted brew basket 310 to rinses the brew basket 310 and discard any coffee grounds remaining in the brew basket 310 into the waste chute 414.

Once the brew basket 310 has been rinsed, the brew basket 310 in the rinse station is further rotated about the carousel shaft 325 into the ground coffee receiving position to receive the next apportioned ground coffee from the cavity 250 of the portioning cup 244.

The waste chute 414 extends downwardly into a removable waste storage box 510 of the waste system 500. A bottom surface of the waste storage box 510 includes a meshing structure preferably made out of stainless steel which allows for the separation of solid waste from liquid waste. The solid waste is retained inside of the box 510 while the liquid waste drains into a drain plate 520 positioned below the waste storage box 510. A drain opening is connected to the drain plate 520 to drain the liquid waste from the plate 520.

The waste storage box 510 is provided with handles 512 so that the box 510 can be slidably removed from the coffee apparatus 100 to dispose of the coffee grounds. The solid waste particles may be composted while the liquid waste drains into the draining system. Sensors are provided to confirm the presence or absence of the waste storage box 510 in the coffee apparatus 100. If the waste storage box 510 is removed from the coffee apparatus 100 or is not properly received by the coffee apparatus 100, an alarm, such as an audible sound or visual indicator, may be activated to indicate the absence of the waste storage box 510 and the coffee apparatus 100 may default to an off condition. First and second removable carafes 610 and 620 are arranged below the first coffee catchment funnel 406 and the second coffee catchment funnel 410, respectively. The following descriptions will be restricted to the second carafe 620 but should be understood as being equally applicable to carafe 610.

A top surface of the carafe 620 defines a downwardly tapered opening 612 which funnels the brewed coffee received from the catchment funnel 410 into the carafe 620. A heat retention cap 613 may be provided to cover the opening 612 to retain the heat of the brewed coffee stored in the carafes. A coffee outlet nozzle 614 is defined by a bottom surface of the carafe. The carafe 620 is supported on a carafe plate. A front end of the carafe plate is hinged mounted or supported by a frame support 623 of the apparatus 100 while the back end is arranged to sit on top of and be supported by a load sensor 622 which detects a change in the weight of the fluid contained in the carafe 620. The load sensor 622 monitors and provides feed back control signals for the apparatus as the weight of the fluid stored in carafe 620 changes. The water system may also further include rinsing nozzle extending in the respective carafes 610, 620. Preferably the nozzles are arranged to direct water flow tangentially towards an inner circumferential surface of the carafes 610, 620 from a top portion to direct the flow in a spiral like manner from the top towards the bottom to clean the surfaces of the carafe interior.

The coffee outlet nozzle 614 is sized to be received by an associated carafe coupler 630. Arranged on opposing sides of the coupler 630 and in fluid communication through fluid tubes 632 are a dispensing pinch valve 652 and a waste pinch valve 654. The waste pinch valve 654 is in fluid communication with the drain plate 520 and operable to direct the flow of brewed coffee from the carafe 620 into the drain plate 520 to dispense of the coffee stored in the carafe 620. The dispensing pinch valve 652 is in fluid communication with a dispensing nozzle 650 to dispense the coffee to coffee cup 700.

The following description will be restricted to the dispensing pinch valve 652 but is to be understood as being equally applicable to waste pinch valve 654. The dispensing pinch valve 652 includes a pinch valve motor 669, a pinch valve housing 670 which houses a roller sleeve 671 extending between rotatable valve bobbins 672a, 672b, and a cushioning mat 673. The pinch valve housing 670 defines openings for the fluid tube 632 to pass through the housing 670. The fluid tube 632 is guided through the housing and arranged in abutting contact below the cushioning mat 673. In operation, the pinch valve motor 669 rotatably drives the valve bobbins 672a, 672b to pinch the fluid tube 632 between the cushioning mat 673 and roller sleeve 671 to close the valve 652. The cushioning matter provides an optimized seal and better pinching at lower torques. Preferably, the fluid tubes 632 are sufficiently resilient and flexible to be fully pinched and close the valve 652.

The flow rate of brewed coffee dispensed by the nozzle 650 is controlled by the dispense valve 652. Preferably the nozzle 650 is partitioned vertically in half to separate the coffee flowing from the individual carafes 610, 620. The nozzle 650 may also include downwardly extending substantially vertical flutes which provide laminar flow of the coffee being dispensed from the nozzle 650 to prevent splashing during dispensing.

The coffee is dispensed into the cup 700 which is received in the fill bay 720. The cup 700 is arranged to sit on top of catchment grill 722. The catchment grill 722 is supported by a vertically displaceable arm 726 which is supported by a load sensor 728 that detects a change in the weight of the fluid contained in the cup 700, and height sensors 724 detect the size of the cup 700, as for example small, medium or large, arranged in the fill bay 700. The load sensor 728 and height sensor 700 monitor and provide feed back control signals for the apparatus to automatically dispense the correct amount of coffee to the cup 700.

Although this disclosure had described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

To the extent that a patentee may act as its own lexicographer under applicable law, it is hereby further directed that all words appearing in the claims section, except for the above defined words, shall take on their ordinary, plain and accustomed meanings (as generally evidence, inter alia, by dictionaries and/or technical lexicons), and shall not be considered to be specially defined in this specification. Notwithstanding this limitation on the inference of "special definitions," the specification may be used to evidence the appropriate, ordinary, plain and accustomed meanings (as generally evidenced, inter alia, by dictionaries and/or technical lexicons), in the situation where a word or term used in the claims has more than one pre-established meaning and the specification is helpful in choosing between the alternatives.

I claim:

1. An apparatus for brewing coffee comprising: a ground coffee feed system comprising:
    a hopper for storing ground coffee, the hopper having an open top for receiving the ground coffee and an open bottom, and a portion control assembly for apportioning a volume of the ground coffee received through the open bottom of the hopper;
    a brewing assembly disposed below the ground coffee feed system, the brewing assembly comprising:
    a ground coffee receiving station for receiving the apportioned ground coffee from the portion control assembly, at least one brewing station for brewing the apportioned ground coffee, the at least one brewing station including a brew nozzle arranged above a corresponding catchment funnel, a basket rinse station for rinsing a brew basket, the basket rinse station including a basket rinse nozzle arranged above a corresponding waste chute, and the brew basket, wherein the brewing assembly is operable to rotate the brew basket between the ground coffee receiving station, the at least one brewing station and the basket rinse station;
    a water system comprising a boiler for supplying heated water to the brew nozzle and the basket rinse nozzle;
    a waste system comprising a removable waste storage box disposed below the waste chute, the waste storage box including a meshing structure to separate solid waste from liquid waste and a drain opening for draining liquid waste from the waste storage box;
    a coffee storage comprising:
    a removable carafe for storing coffee brewed in one of the at least one brewing station, the carafe having an opening defined by a downwardly tapering top surface of the carafe, and a coffee outlet nozzle, and a carafe coupler arranged to receive the coffee outlet nozzle;
    a dispensing system comprising: a dispensing pinch valve in fluid communication with the carafe coupler, a waste pinch valve in fluid communication with the carafe coupler, wherein the waste pinch valve is in fluid communication with the waste storage box; and
    a dispensing nozzle arranged in a fill bay, wherein the dispensing pinch valve is in fluid communication with the dispensing nozzle; and
    the portion control assembly further comprising: a housing body defining a bottom outlet opening and a top inlet opening arranged to align with the open bottom of the hopper, a portioning cup rotatably supported in the housing body, the portioning cup defining a cavity sized to receive a fixed volume of the ground coffee, and a motor coupled to the portioning cup, the motor being operable to rotate the portioning cup within the housing body; and
    the apparatus further comprising:
    a shutter assembly having a base mounted to the hopper, the base defining an open passageway aligned with the open bottom of the hopper, and a sliding funnel shutter movable with respect to the base between an open position allowing for the passage of ground coffee through the base and a closed position blocking the passage of ground coffee through the base, wherein the base is detachably secured to the housing body of the portion control assembly.

2. An apparatus for brewing coffee comprising:

a ground coffee feed system comprising:

a hopper for storing ground coffee, the hopper having an open top for receiving the ground coffee and an open bottom, and a portion control assembly for apportioning a volume of the ground coffee received through the open bottom of the hopper;

a brewing assembly disposed below the ground coffee feed system, the brewing assembly comprising:

a ground coffee receiving station for receiving the apportioned ground coffee from the portion control assembly, at least one brewing station for brewing the apportioned ground coffee, the at least one brewing station including a brew nozzle arranged above a corresponding catchment funnel, a basket rinse station for rinsing a brew basket, the basket rinse station including a basket rinse nozzle arranged above a corresponding waste chute, and the brew basket, wherein the brewing assembly is operable to rotate the brew basket between the ground coffee receiving station, the at least one brewing station and the basket rinse station;

a water system comprising a boiler for supplying heated water to the brew nozzle and the basket rinse nozzle;

a waste system comprising a removable waste storage box disposed below the waste chute, the waste storage box including a meshing structure to separate solid waste from liquid waste and a drain opening for draining liquid waste from the waste storage box;

a coffee storage comprising: a removable carafe for storing coffee brewed in one of the at least one brewing station, the carafe having an opening defined by a downwardly tapering top surface of the carafe, and a coffee outlet nozzle, and a carafe coupler arranged to receive the coffee outlet nozzle; a dispensing system comprising: a dispensing pinch valve in fluid communication with the carafe coupler, a waste pinch valve in fluid communication with the carafe coupler, wherein the waste pinch valve is in fluid communication with the waste storage box: and a dispensing nozzle arranged in a fill bay, wherein the dispensing pinch valve is in fluid communication with the dispensing nozzle: and the portion control assembly further comprising:

a housing body defining a top inlet opening arranged to align with the open bottom of the hopper, and a bottom outlet opening, a motor, and a rotatable auger conveyor supported in the housing body and rotationally coupled to the motor to convey the ground coffee received in the housing body towards the outlet opening of the housing body; and the apparatus further comprising:

a shutter assembly having a base mounted to the hopper, the base defining an open passageway aligned with the open bottom of the hopper, and a sliding funnel shutter movable with respect to the base between an open position allowing for the passage of ground coffee through the base and a closed position blocking the passage of ground coffee through the base, wherein the base is detachably secured to the housing body of the portion control assembly.

3. The apparatus according to claim 2, further comprising a bean grinder interposed between the hopper and the shutter assembly.

* * * * *